Jan. 18, 1966 R. R. ODDO ETAL 3,230,522
ELECTROMECHANICAL TRIGGER FOR ENCODER APPLICATION
FOR NON-AMBIGUITY READOUT
Filed Dec. 14, 1962

ROCCO R. ODDO
GEORGE LAPP
INVENTOR.

BY S. A. Giarratana
Francis L. Masselle
ATTORNEYS

United States Patent Office 3,230,522

Patented Jan. 18, 1966

3,230,522
ELECTROMECHANICAL TRIGGER FOR ENCODER APPLICATION FOR NON-AMBIGUITY READOUT

Rocco Ralph Oddo, Brooklyn, N.Y., and George Lapp, Oakland, N.J., assignors to General Precision, Inc., Little Falls, N.J., a corporation of Delaware Filed Dec. 14, 1962, Ser. No. 244,667
2 Claims. (Cl. 340—347)

The present invention relates to electromechanical triggers for producing pulses and more particularly to an electromechanical trigger for producing an unambiguous trigger pulse which can be used to control the change of state of an encoder to enable an unambiguous readout to be obtained.

In accordance with one embodiment of the present invention high and low speed code tracks are connected together in an oriented relationship for rotation relative to one another at a predetermined speed differential. The high speed code track has a single output associated therewith and the low speed code track has a lead and a lag output associated therewith. Each output undergoes a change of state at predetermined angular positions under the control of the code tracks. The orientation of each of the code tracks relative to one another is such that when the single output undergoes a transition from one state to another state, the lead and lag outputs are always spaced from a transition point on the low speed track. The angular orientation of the lead and lag outputs is also such that after the single output changes state, the lag output subsequently changes state before the single output changes state again. A suitable logic circuit is provided to read out the lead output when the single output is in one state and to read out the lag output when the single output is in its other state. With this arrangement an output pulse is produced by the logic circuitry which is never ambiguous because a transition ambiguity of the lead or lag outputs is avoided by selectively reading out the lead or lag outputs in response to the state of the single output associated with the high speed track.

In practice, the code tracks preferably will be a part of mechanically connected binary encoder drums, and the trigger pulses will be utilized to distinguish between such conditions as plus or minus, up or down, east or west, and north or south, for example. In addition the trigger pulses can be used to switch a code junction to read a lead output as a lag output and vice versa, or to complement a code junction so as to read the complement of a lead output as lead or the complement of a lag output as lag.

Accordingly it is one object of the invention to produce unambiguous trigger pulses which can be used to control changes of state in encoders.

It is another object of the invention to provide electromechanical triggers for producing unambiguous trigger pulses that can be used to control the readout of binary encoders at transition points or junctions.

It is a further object of the invention to rotate high and low speed code tracks at a predetermined speed differential relative to one another and provide a logic circuit for reading either the lead or lag output on the low speed track as determined by the state of a single output on the high speed track in a manner to eliminate the possibility of ambiguities at transition points on the low speed track.

It is a still further object of the invention to provide non-ambiguous electromechanical triggers which are simple and economical to manufacture, rugged and reliable in construction, and effective in use.

Other objects and features of novelty of the present invention will be specifically pointed out or will otherwise become apparent when referring, for a better understanding of the invention, to the following description taken in conjunction with the accompanying drawings, wherein.

Figure 1:
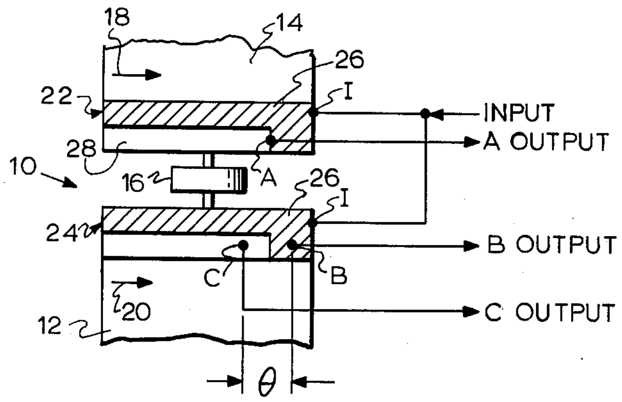
FIG. 1 is a fragmentary view of an electromechanical trigger embodying features of the present invention.

Referring to FIG. 1 an electromechanical trigger 10 is shown which illustrates one embodiment of the invention. It comprises a pair of drums 12 and 14 coaxially aligned with one another and mechanically interconnected by a drive mechanism 16 so that when the drum 14 is rotated by suitable means (not shown) in the direction indicated by the arrow 18, the drum 12 will be rotated in the same direction as indicated by the arrow 20 at a predetermined lower speed. A code track 22 encircles the high speed drum 14 and an identical code track 24 encircles the low speed drum 12. Each of the code tracks comprises a ring 26 of conductive material with a strip 28 of insulating material extending over 180° of the ring 26. The width of the insulated strip is approximately one-half the width of the ring 26.

A stationary input brush I slidably contacts each of the conducting rings 26 to enable a voltage input to be applied to the conducting rings. It will be observed that the input brushes I are positioned so that they will not contact the insulated strips 28 as the drums 12 and 14 rotate. A single brush A makes sliding electrical contact with the code track 22 in position to pass over the insulated strip 28 as the drum 14 rotates. A lag brush B and a lead brush C make sliding electrical contact with the code track 24 at angularly spaced points in position to pass over the insulated strip 28 of the code track 24.

Figure 2:
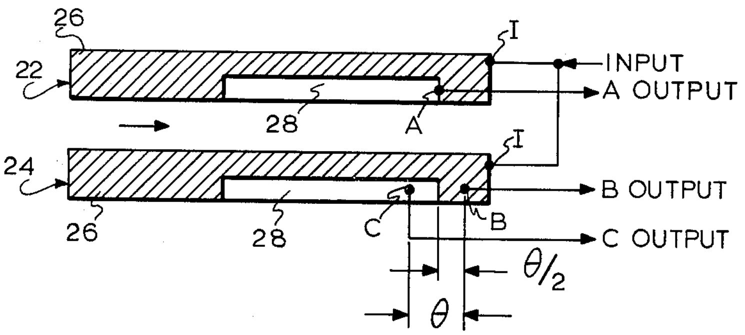
FIG. 2 is a developed view of the two code tracks illustrated in FIG. 1.

When using code tracks with the 180° code as best illustrated in FIG. 2, the drive mechanism 16 is selected to rotate the high speed drum 14 at a speed which is a multiple of the speed of the low speed drum such as, for example, 18 to 1. In addition the drums are oriented relative to one another so that the transition lines between the conducting and non-conducting portions of the code tracks will be aligned with one another each time the low speed drum rotates through one complete revolution. Of course if the code of each of the code tracks employed two 90° non-conductive strips angularly spaced 90° from one another, or some other suitable code, non-multiple speed differentials between the drums 12 and 14 could be selected, as well as, multiple speed differentials.

When the code tracks 22 and 24 are in the position illustrated in FIG. 2 with their transition lines aligned with one another, the A brush is positioned on the transition line between the conductive and non-conductive portions of the code track 22 and the B and C brushes are angularly spaced at the angle $\theta$, each of the brushes being spaced approximately the angle $\theta/2$ from the transition line between the conducting and non-conducting portions of the code track 24. Each of the brushes B and C do not have to be precisely spaced at the angle $\theta/2$ but they should be approximately spaced at this angle and in addition the spacing of the lag brush B should be such that it will undergo a change of state from conductive to non-conductive before the A brush leaves the insulated strip 28 and becomes conductive again.

Figure 3:
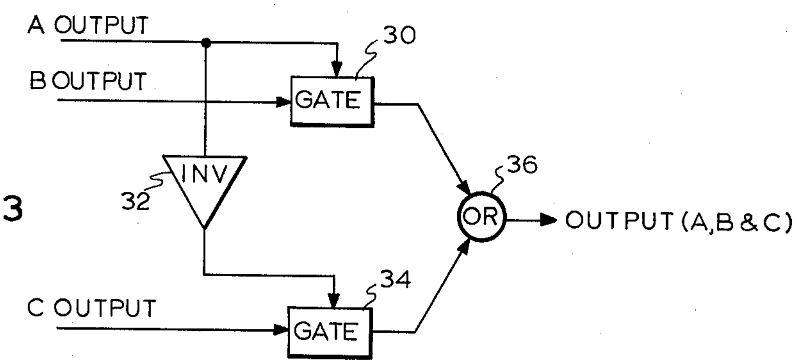
FIG. 3 is a schematic diagram of a logic circuit for reading out the code tracks illustrated in FIGS. 1 and 2.

The logic circuitry for reading the output of the A, B and C brushes is illustrated in FIG. 3. The output of the A brush is applied to the gate 30 and also to an inverter 32 which applies the opposite signal to the gate 34. The B and C brush outputs are applied directly to the gates 30 and 34, respectively, and the outputs of the gates are applied to the OR gate 36 which produces the non-ambiguous trigger pulse output.

With this arrangement neither the B nor the C brush will ever be at a transition point at the same time that the A brush is at a transition point, a transition point being the point at which the output of a brush changes from conductive to non-conductive or non-conductive to conductive. When the A output is conducting, the gate 30 is enabled and the gate 34 is disabled so that only the B output is read out through the OR gate 36. This produces an output pulse when the B output is conducting. Conversely, when the A output is non-conducting, the gate 34 will be enabled and the C output will be read out through the OR gate 36 to produce a pulse when the C output is conducting. Consequently the state of the B and C outputs determines the pulse or no pulse condition as controlled by the state of the A output. Therefore there can never be an ambiguity in the output pulse from the OR gate 36 because by reading out the B or C outputs as determined by state of the A output the possibility of a transition in either the B or C output in avoided. With reference to FIG. 2 it can be seen by observation that as the A brush goes from its conducting state to its non-conducting state, the logic circuitry of FIG. 3 will change over from reading out the state of the B brush which is conducting to reading out the state of the C brush which is non-conducting at this point.

In practice the code tracks 22 and 24 preferably will form part of some binary encoder drums. That is the drums 12 and 14 will be binary encoder drums, and the output of the OR gate 36 will be utilized for distinguishing between such conditions as plus or minus, up or down, east or west, and north or south. In addition the output pulse from the OR gate 36 can be used to trigger a code junction for switching lead and lag brushes, or complementing code junctions to read the complement of a lead brush as lead or the complement of a lag brush as lag.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, although brushes A, B and C have been illustrated for producing electrical outputs from code tracks having conductive and non-conductive bits, it is apparent that other types of code tracks and outputs may be utilized. For example the code tracks may be magnetic or optical with magnetic heads being used to read out the magnetic code tracks and a light source and photo cell being used to read out the optical code tracks.

What is claimed is:

1. An electromechanical trigger comprising:
a pair of rotatable members coupled for conjoint rotation, one at a higher speed than the other;
a circular code track on each of said members concentric to the member's axis of rotation, each said code track being divided lengthwise into a first portion, electrically conductive about the entire 360° of its circumferential extent, and a second portion consisting of respective, electrically conductive and non-conductive segments of 180°;
input means electrically coupled to the first track portion of each of said tracks;
a single, signal-pickoff means electrically coupled to the second track portion of the track of the higher speed rotatable member;
a pair of signal-pickoff means electrically coupled to the second track portion of the track of the lower speed rotatable member, said single and pair of pickoff means being fixedly mounted with respect to each other and relative to said rotatable members, the individual pickoff means of the pair of pickoff means being disposed respectively to lead and trail the single pickoff means, with reference to direction of rotation of said rotatable members, by substantially equal circumferential distances; and
logic circuit means for deriving an output signal from the leading pickoff means when the single pickoff means is on one of said 180° segments and from the trailing pickoff means when the single pickoff means is on the other of said 180° segments, said logic circuit means including an OR gate; a pair of AND gates, each having a pair of inputs and an output, the output of each AND gate feeding said OR gate, one of said AND gates having one input connected to said single pickoff means and its other input connected to a trailing pickoff means, the other AND gate having one input connected to the leading pickoff means; and an inverter connecting said single pickoff means to the other input of said other AND gate.

2. An electromechanical trigger comprising:
a pair of rotatable members having respective surfaces bearing binary code tracks of circular configuration, formed of a pattern of electrically conductive and electrically non-conductive areas, the pattern on each of said members including at least one track concentric to the respective axis of rotation of the member, divided lengthwise into respective first and second portions, each of said first track portions being conductive about the entire 360° of its circumferential extent, and each of said second track portions having a conductive segment of 180° and a non-conductive segment of 180°;
means coupling said members for conjoint rotation, one at a higher speed than the other;
input electrical contact means slidably coacting with the first track portion of said one track on each rotatable member;
a single contact brush means slidably coacting with the second track portion of said one track on the member rotatable at higher speed;
a pair of contact brush means slidably coacting with the second track portion of said one track on the member rotatable at lower speed, all of said contact brush means being fixedly mounted with respect to one another and relative to said rotatable members, the individual contact brush means of said pair of brush means being circumferentially spaced, at respective, substantially equal distances leading and trailing said single brush means, with reference to the direction of rotation of said rotatable members; and
logic circuit means for deriving a signal from the leading contact brush means of said pair when said single contact brush means is on one of said 180° segments and from the trailing contact brush means when said single contact brush means is on the other of said 180° segments, said logic circuit means including an OR gate; a pair of AND gates, each having a pair of inputs and an output, the output of each AND gate feeding said OR gate, one of said AND gates having one input connected to said single contact brush means and its other input connected to the trailing contact brush means, the other AND gate having one input connected to the leading contact brush means; and an inverter connecting said single contact brush means to the other input of said other AND gate.

References Cited by the Examiner

UNITED STATES PATENTS

| | | | |
|---|---|---|---|
| 2,943,311 | 6/1960 | Hulst | 340—347 |
| 2,958,861 | 11/1960 | Luongo et al. | 340—347 |
| 3,054,996 | 9/1962 | Spaulding et al. | 340—347 |

MALCOLM A. MORRISON, *Primary Examiner.*

L. W. MASSEY, W. J. KOPACZ, *Assistant Examiners.*